July 3, 1934.  P. A. ROTHE  1,965,003
FLOWER BASE
Filed June 2, 1933
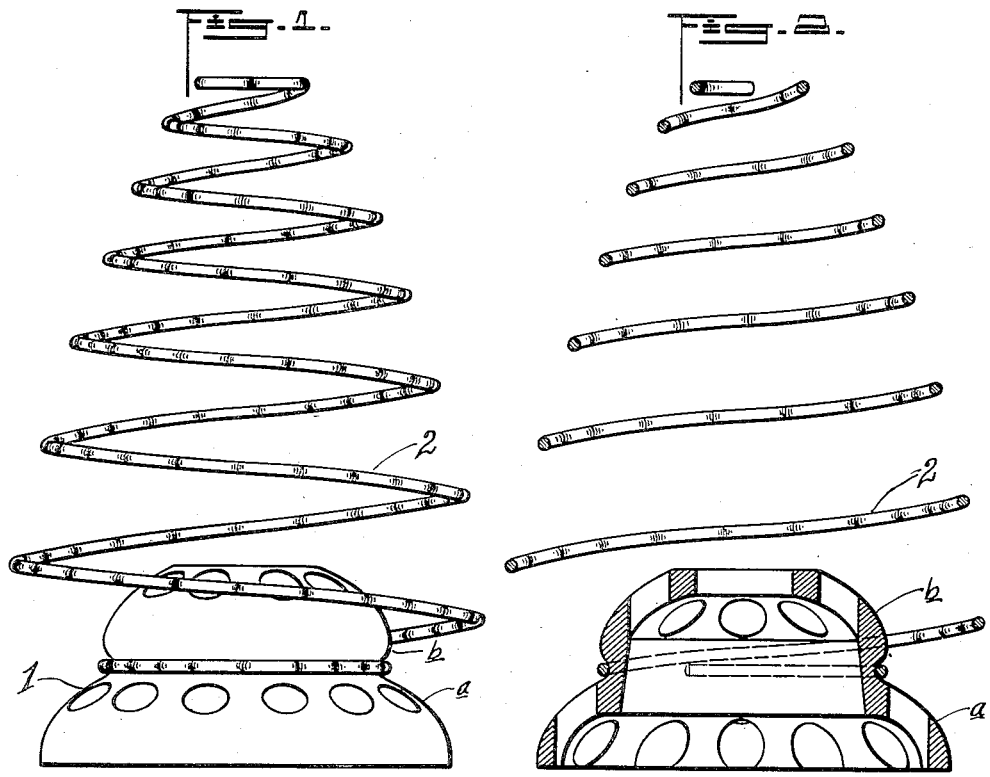
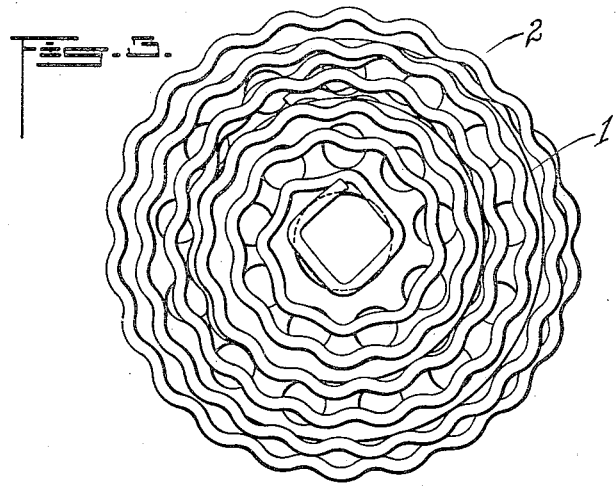
INVENTOR
Paul A. Rothe
BY Victor D. Borst
ATTORNEY Patented July 3, 1934

1,965,003

UNITED STATES PATENT OFFICE 1,965,003

FLOWER BASE

Paul A. Rothe, New York, N. Y., assignor to Edith J. Meyer Co., Inc., a corporation of New York Application June 2, 1933, Serial No. 674,013

2 Claims. (Cl. 47—41)

My invention relates to a device for holding flowers and in particular it contemplates a flower holder which is especially suitable for supporting a bouquet of flowers in the form of a spray.

It is an object of my invention to provide a flower holder which will effectually support a bouquet of flowers arranged, for example, in the form of a spray and which will permit of variations in accordance with the effect desired, the container for the flowers or the character of the flowers.

I accomplish the object of my invention by providing a holder which includes a hollow base, the interior of which forms a limited confined space in which the stems of flowers supported thereby are received. The base has an inclined side wall with a series of openings therethrough at different levels, through which the stems of flowers may extend into the interior of the base. The openings to receive the flower stems are considerably larger than the stems and due to the inclination of the wall through which the openings are cut the flowers may be set, and will be supported at various angles. The confined space formed by the hollow holder causes the stems of the flowers which are inserted through the openings in the wall to become interlaced so that when the base is lifted, the flowers remain in their proper position. In conjunction with the base, I provide a flower-stem support which extends from the base and engages the stems of flowers at a distance from the base. This support may be removed from the base when short-stem flowers form the bouquet. When long-stem flowers form the bouquet, the flower-stem support, engaging the stems at a distance from the base, provides additional support and maintains the flowers as originally arranged.

Specifically, in one form, my invention is embodied in a device for holding a bouquet of flowers which comprises a hollow base which forms a limited, confined space for the flower stems. The side wall of the base includes two sections shaped as sections of spheres of different radii. The upper section is substantially semi-spherical and forms the top as well as the upper portion of the side wall of the base. Through each section of the side wall, there is a series of openings through which the stems of flowers may pass in to the interior of the base. This base will support short-stemmed flowers inserted therein and when the stems of the flowers are pushed in to the confined space within the base they become interlaced and will not be disturbed if the base is lifted to clean the container in which the flowers are mounted. The openings are comparatively large in comparison with the stems of the flowers and formed in an inclined wall so that the stems may be inserted through and supported in the openings at various angles. The flowers can thus be arranged in the holder to suit the individual taste.

For long-stemmed flowers, a flower-stem support is mounted on the base. The support consists of an extended, spirally wound, crimped wire which embraces the base at the juncture of the two sections thereof and extends vertically therefrom. The successive convolutions of the extended, spirally wound, crimped wire form supports for the stems of the flowers at varying distances from the base and also at various radii from the axial center of the crimped wire support. With this support, the long-stemmed flowers may be readily and easily arranged in the form of a uniformly distributed spray or otherwise to secure a desired effect. When arranged, the crimps in the wire maintain each flower stem in its proper place. When it is desired to clean the container in which the flowers are mounted, the holder may be lifted, and when lifted, due to the interlacing of the stems within the base and the crimps in the wire support, the flowers will remain as originally arranged.

Such an embodiment of my invention is described in detail below and illustrated in the accompanying drawing in which:

Fig. 1 is a side elevation of the flower holder;
Fig. 2 is a sectional elevation of the same; and
Fig. 3 is a plan of the same.

The flower holder illustrated in the drawing includes a base 1 and a stem support 2. The base 1 is a hollow circular base including two sections, one section $a$ which forms the lower portion of the side wall, and another section $b$ which constitutes the upper portion of the side wall and the top. The sections $a$ and $b$ are sections of spheres of different radii; the section $a$ is a section of the sphere of greater radius than the sphere of which the section $b$ forms a part. The section $b$ is practically a semisphere. Circumferentially of the section $a$ and that portion of the section $b$ which forms a part of the side wall of the base, there is formed a series of spaced openings through the wall of the base. These openings are provided to receive the stems of flowers. The openings through the side wall of the base are quite large in comparsion with the ordinary diameter of the stems of flowers and when cut through the inclined walls, these large holes are adapted to receive, and the edges thereof to support the stems of flowers extending from the base at various angles. Thus, with a relatively small number of holes and sections to the base, the flowers may be arranged in the form of a spray and the character or area of the spray, and the distribution of the flowers thereof may be varied to suit the conditions, such as the size of the container for the flowers or the flowers themselves. The ends of the stems extending into the confined space formed by the hollow base causes the stems to be interlaced within the base. This interlacing of the stems holds the stems in the position in which they were placed even while the base is removed to clean the container or to transfer the flowers.

While the stem support 2 may be removed from the base and the base used alone with short-stemmed flowers, this stem support 2 is particularly valuable in supporting long-stemmed flowers. The support is an extended spirally wound crimped wire. The wider convolutions or the convolutions of greater diameter are close to the base and successive convolutions decrease in radius as the distance of the convolutions from the base. Constructed in this way, the wire is adapted to hold the flowers adjacent the center in a substantially vertical position while those flowers which are removed from the center are supported at various angular positions. Thus, a uniformly distributed spray may be formed. The crimps in the wire as indicated at 2a, receive the flower stems and hold the stems from movement about the wire. A section of the wire adjacent the end thereof is bent to a diameter such that it clamps the base at the juncture of the two sections a and b. This clamping action secures the wire stem support to the base and provides a securing means by which the stem support can be readily and easily snapped on to the base or removed therefrom when, for example, it is desired to use the base alone for short-stemmed flowers.

It is obvious that various changes may be made by those skilled in the art in the details of the embodiment of my invention disclosed in the drawing and described above within the principle and scope of my invention as expressed in the appended claims.

I claim:

1. A device for holding a bouquet of flowers comprising a hollow base having a series of openings through the walls thereof adapted to receive the stems of flowers, and an expanded, spirally wound, crimped wire mounted on the base and forming a support for the stems of the flowers at a distance from the base.

2. A device for holding a bouquet of flowers comprising a hollow base forming a limited confined space and having side walls including two sections shaped as sections of spheres of different radius with a series of openings therethrough to receive the stems of flowers, and an expanded, spirally wound, crimped wire embracing the base at the juncture of the two sections thereof and extending therefrom, the wire forming a support for the stems of the flowers at a distance from the base.

PAUL A. ROTHE.